(12) United States Patent
Woo

(10) Patent No.: US 6,817,683 B2
(45) Date of Patent: Nov. 16, 2004

(54) STORAGE UNIT FOR DISKS

(76) Inventor: Hung Kan Woo, Room 3, 13th Floor, Block B, Chol Ching House, Choi Po Court, Sheung Shui (HK)

(*) Notice: Subject to any disclaimer, the term of this patent is extended or adjusted under 35 U.S.C. 154(b) by 40 days.

(21) Appl. No.: 10/227,040

(22) Filed: Aug. 23, 2002

(65) Prior Publication Data

US 2004/0036390 A1 Feb. 26, 2004

(51) Int. Cl.[7] ............................................. A47B 81/06
(52) U.S. Cl. ..................................... 312/9.43; 312/9.54
(58) Field of Search ................................ 312/9.54, 9.1, 312/9.64, 205, 334.3, 334.2, 9.9, 9.8, 9.41, 9.42, 9.43, 9.44, 9.47, 9.48; 206/308.1, 308.3, 312, 309, 311

(56) References Cited

U.S. PATENT DOCUMENTS

| | | | | |
|---|---|---|---|---|
| 607,539 A | * | 7/1898 | Camp | 190/17 |
| 1,917,980 A | * | 7/1933 | Kelsey | 312/183 |
| 2,850,344 A | * | 9/1958 | Cook | 312/9.48 |
| 4,647,117 A | * | 3/1987 | Ackeret | 312/9.32 |
| 4,765,469 A | * | 8/1988 | Seifert | 206/454 |
| 5,161,682 A | * | 11/1992 | Seifert et al. | 206/308.1 |
| 5,271,502 A | * | 12/1993 | Chang | 206/425 |
| 5,558,221 A | * | 9/1996 | Scior | 206/308.3 |
| 5,785,399 A | * | 7/1998 | Frankeny et al. | 312/324 |

FOREIGN PATENT DOCUMENTS

GB 867405 * 5/1961 ................ 312/9.43

* cited by examiner

*Primary Examiner*—James O. Hansen
(74) *Attorney, Agent, or Firm*—Jackson Walker LLP

(57) ABSTRACT

A storage unit for disks includes a first end member, a second end member disposed in a parallel relationship with respect to the first end member. An extension mechanism having a series of interconnected members is connected between the first and second end members and co-operates with them to maintain the parallel interrelationship as the members are moved toward or away from one another. A connected array of pockets extends between the end members. Opposite end ones of the pockets are attached to a respective one of the end members. Each pocket is adapted to receive at least a portion of a disk. There are more pockets than there are interconnected members in the extension mechanism.

10 Claims, 4 Drawing Sheets

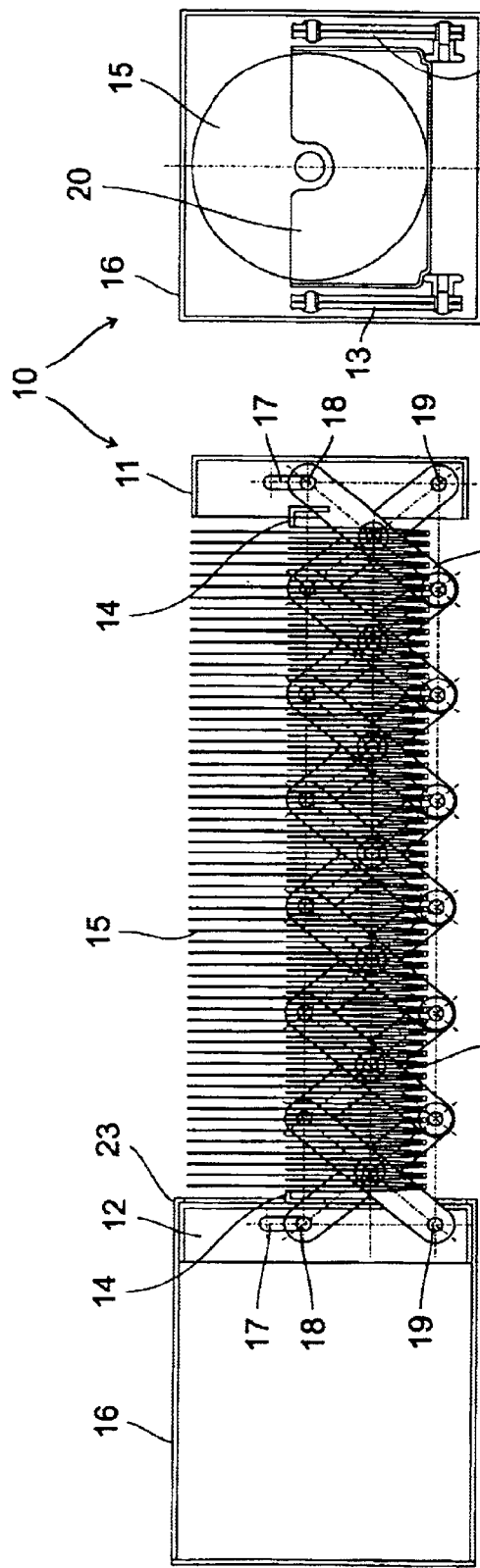
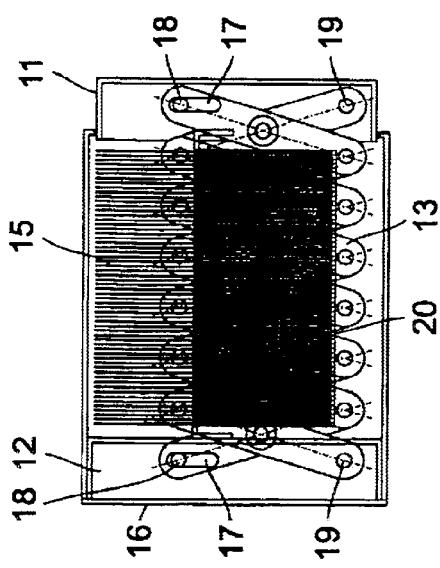
FIGURE 1
FIGURE 2
FIGURE 3

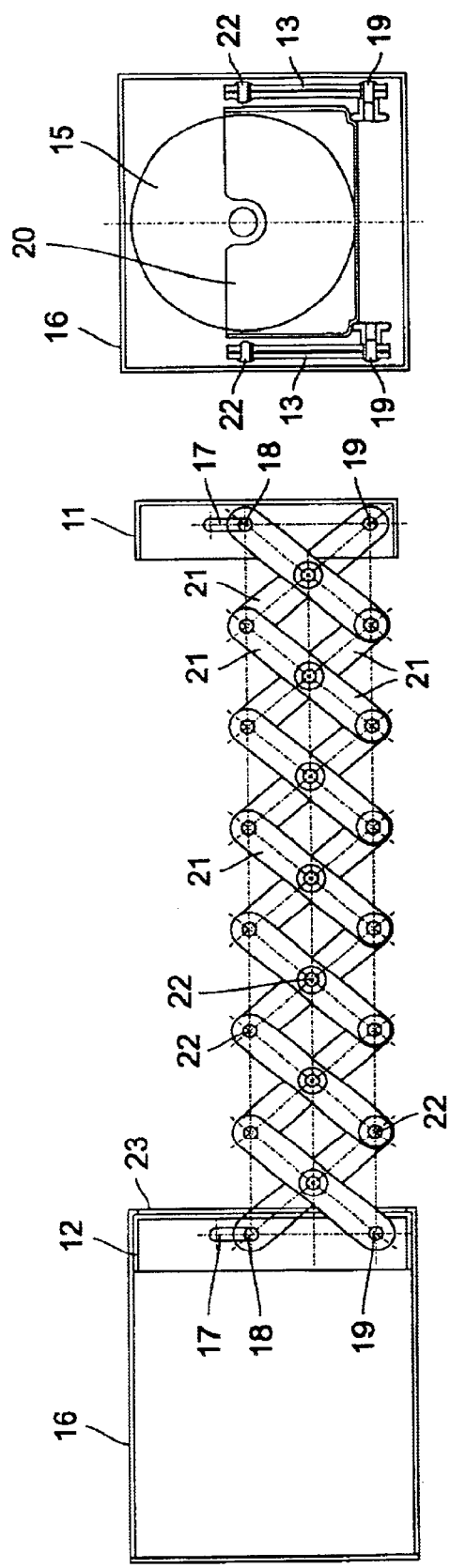
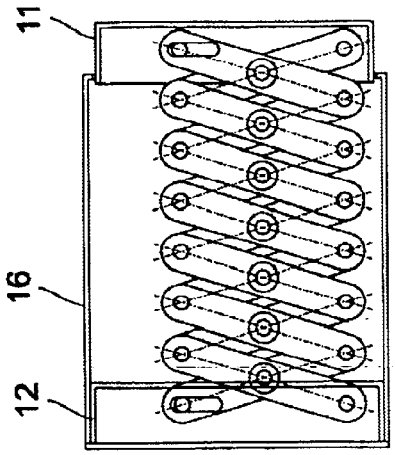
FIGURE 4
FIGURE 5
FIGURE 6

STORAGE UNIT FOR DISKS

BACKGROUND OF THE INVENTION

The present invention relates to a storage unit for disks. More particularly, although not exclusively, the invention relates to a storage unit for CDs, DVDs, VCDs, floppy disks, diskettes, ZIP disks, or other flat objects that might be disks, data cards, photographs, or any flat object, large quantities of which might need to be stored together.

U.S. Pat. No. 5,161,682 discloses a multi-sectional storage receptacle for floppy disks. A number of pockets are arranged side-by-side, with respective corners of the pockets interconnected by connection element structures 19–23. That is, each individual storage pocket has associated with it a complex arrangement of interconnecting elements. Where it is desired to store a large number of disks for example, the storage device of this patent reference becomes overly-expensive and cumbersome.

U.S. Pat. No. 5,785,399 discloses a small CD container having interconnected pockets extending between respective opposed parts 12 and 20 of a hinged container. When opened, the pockets fan apart to enable easy retrieval and insertion of the disks. The storage capacity of this referenced device is limited by the hinged interconnection of the opposed parts 12 and 20.

U.S. Pat. No. 4,765,469 discloses a multi-sectional storage container for disks. Individual rigid disk receptacles are interconnected in an articulated manner by separate parallelogram linkages 2. That is, separate linkages are required for each individual disk storage receptacle. Again, where a large number of disks is to be stored, this device would become overly cumbersome and expensive.

OBJECTS OF THE INVENTION

It is an object of the present invention to overcome or substantially ameliorate at least one of the above disadvantages and/or more generally to provide an improved storage unit for disks.

It is a further object of the present invention to provide an improved storage unit for disks, having a relatively high storage capacity, with a limited number of articulated components enabling expansion for disk insertion and retrieval.

DISCLOSURE OF THE INVENTION

There is disclosed herein a storage unit for disks, comprising:
 a first end member,
 a second end member disposed in a substantially parallel relationship with respect to the first end member,
 an extension mechanism comprising a series of interconnected members connected between the first and second end members and co-operating therewith to maintain said substantially parallel interrelationship as the members are moved toward or away from one another, and
 a connected array of pockets, opposite end ones of which are attached to a respective one of said end members, each pocket being adapted to receive at least a portion of a disk, there being more of said pockets than there are of said interconnected members.

Preferably the interconnected members of the extension mechanism are associated with one another in a scissor-like manner.

Preferably the pockets each have a pair of opposed walls, a wall of each pocket being attached to a wall of an adjoining pocket.

Preferably the end members each comprise an end plate.

Preferably a respective member of the extension mechanism is attached pivotally to each end plate.

Preferably a respected member of the extension mechanism is attached slidably to each end plate.

Preferably there are two said extension mechanisms.

Preferably the array of pockets resides in between said two extension mechanisms.

Preferably one of the end plates is received permanently within a container.

Preferably said one of the end plates is received slidably within the container.

Preferably the other of said end plates forms a cover for said container.

BRIEF DESCRIPTION OF THE DRAWINGS

A preferred form of the present invention will now be described by way of example with reference to the accompanying drawings, wherein:

FIG. 1 is a schematic cross-sectional elevational view of a disk storage unit in an extended configuration, FIG. 2 is a schematic cross-sectional elevational view of the disk storage unit of FIG. 1 in a contracted storage configuration, FIG. 3 is a schematic end elevational view of the disk storage unit of FIG. 1, FIGS. 4 to 6 are equivalent to FIGS. 1 to 3 respectively, but omitting the disks and disk storage pockets.

DESCRIPTION OF THE PREFERRED EMBODIMENT

Figure 7:
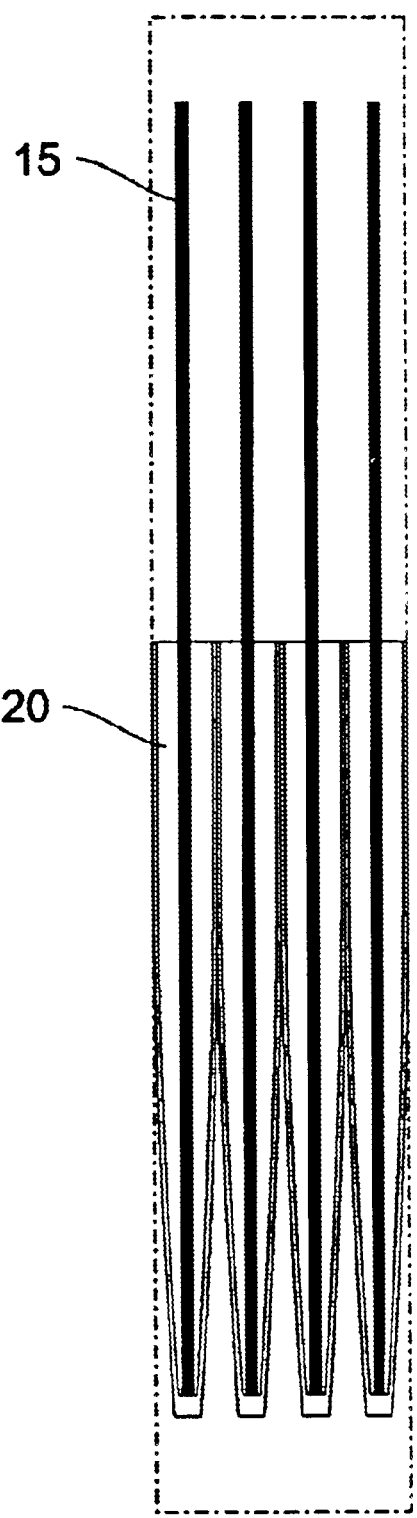
FIG. 7 is a schematic cross-sectional elevational view of a few of the pockets in an extended configuration.
Figure 8:
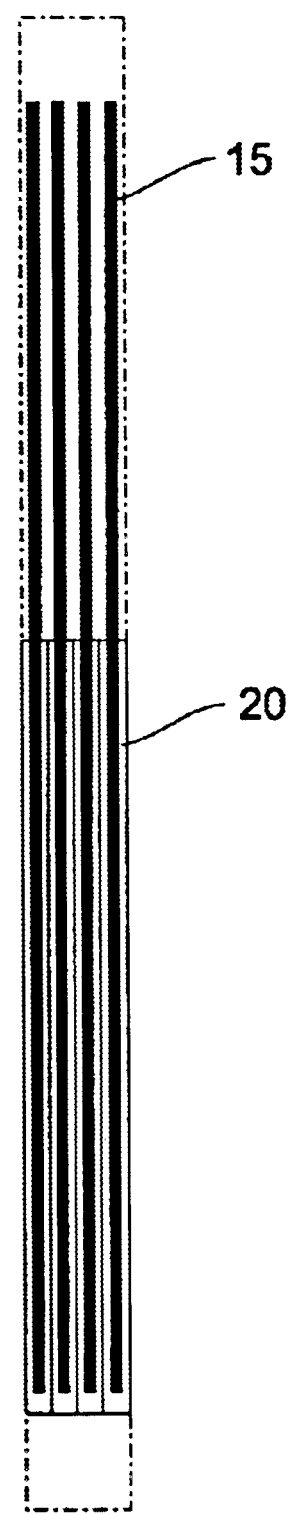
FIG. 8 is a schematic cross-sectional elevational view of the pockets of FIG. 7 in a contracted configuration.

In the accompanying drawings there is schematically depicted a disk storage unit 10. Storage unit 10 comprises a container 16 within which there is slidably received an end plate 12. Container 16 is typically square as shown in FIG. 3 as is the end plate 12. The container 16 includes a lip 23 to prevent detachment of the end plate 12 therefrom. Extending from the end plate 12 is a pair of scissor-action extension mechanisms 13. Each mechanisms 13 comprises a series of crossing pairs of members 21 as shown. The midpoints of each member 21 are pivotally interconnected to one another and the end points of each member are pivotally connected to one another as well. A number of pivots 22 in the form of rivets, screws or like a provided at the midpoints and endpoints.

Supported at the other end of the scissor-action mechanisms, there is provided another end plate 11. The end plate 11 forms a lid for the container 16 when the storage unit is closed.

Both end plates 11 and 12 comprise a pair of opposed slots 17 into each of which there is pivotally, slidably received a pin 18 at the end of the end-most linkage member 21. Pin 19 attaches the other end-most crossing linkage member 21 to the end plates 11 and 12. The scissor-action mechanism ensures that the end plates 11 and 12 remain substantially parallel to one another as they are removed either toward or away from one another.

The container 16, end plates 11 and 12 and scissor-action mechanisms might all be manufactured from metal, plastics or other durable material.

Also extending between the end plates 11 and 12 is a series of pockets 20. Pockets 20 are typically sized to receive just over half a disk 15. The end-most pockets have extending therefrom a spacer 14 to prevent those pockets from being over-deeply concealed within either the end plate 11 or container 16 when the storage unit is closed to the configuration of FIGS. 2 and 5. Opposite end ones of the pockets are connected to the respective end plates 11 and 12 such that upon extension of the storage unit to the configuration depicted in FIGS. 1 and 4, the pockets expand.

Figure 9:
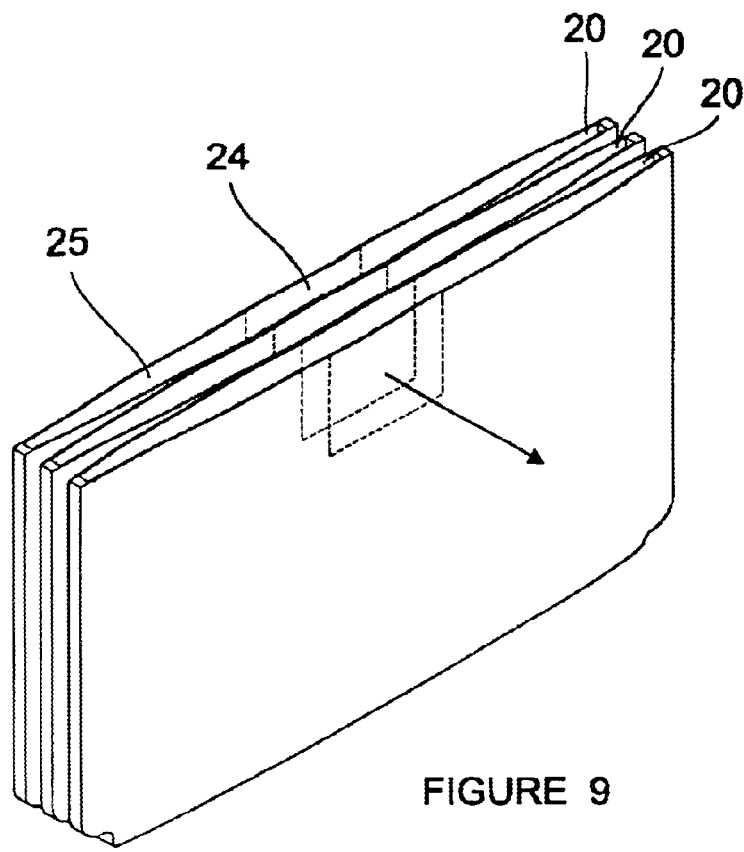
FIG. 9 is a schematic perspective illustration of the pockets of FIG. 7.
Figure 10:
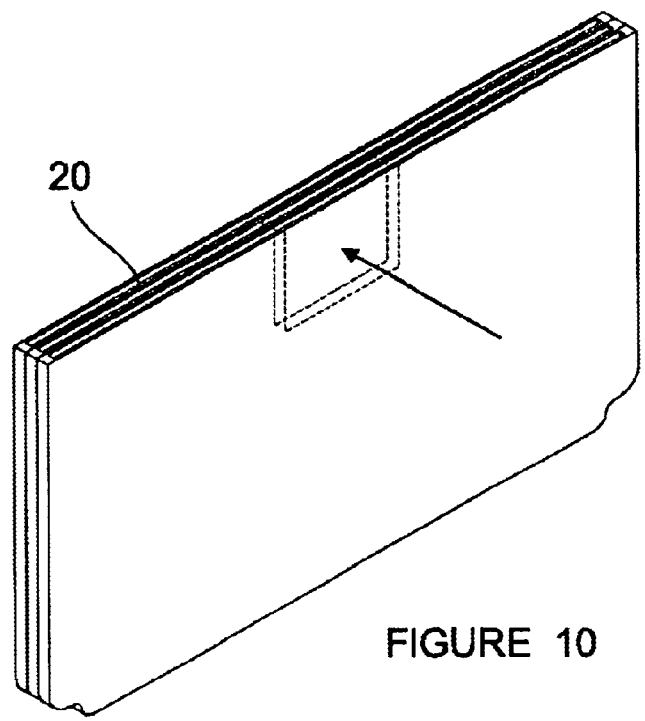
FIG. 10 is a schematic perspective illustration of the pockets of FIG. 8.

The pockets 20 are typically formed of a molded plastic material, but might alternatively be formed of paper, cardboard or other thin flexible material. As shown in FIG. 9, each pocket 20 includes a mid-region 24 at the upper edge of each side wall, at which the pockets are interconnected. The interconnection might be by way of plastics-welding, glue, adhesive tabs, staples or other means. By this interconnection, the pocket openings spread apart to the configuration best depicted in FIG. 9 as the storage unit is opened.

In use the cover or end plate 11 can be withdrawn from the configuration depicted in FIG. 2 to that of FIG. 1. At the same time, the scissor-action mechanism maintains a parallel interrelationship between plates 11 and 12. Also at the same time, the series of pockets 12 expands due to the interconnection between the end-most pockets with the respective plates 11 and 12. When fully extended (i.e. when the pins 18 reaches the end of their slots 17, the end plate 12 slides from the back of the container 16 to the front, to thereby expose the last ones of the pockets 20. As can be seen, there are many more pockets 20 then there are a linkages in the scissors-action mechanism and the exact number of linkages and pockets is unrelated. Closure of the storage unit 10 is simply a reversal of the opening action described.

It should be appreciated that modifications and alterations obvious to those skilled in the art are not to be considered as beyond the scope of the present invention.

What is claimed is:

1. A storage unit for disks, comprising:

a first end member, a second end member disposed in a substantially parallel relationship with respect to the first end member, an extension mechanism comprising a series of interconnected members connected between the first and second end members and co-operating therewith to maintain said substantially parallel interrelationship as the first and second end members are moved toward or away from one another, the interconnected members of the extension mechanism are associated with one another in a scissor-like manner, and a connected array of expanding pockets each comprising a pair of opposed side walls formed of flexible material and having upper edges comprising a mid-region at which the pockets are interconnected, and ones of the pockets being attached to a respective one of the end members, each pocket being adapted to receive at least a portion of a disk, there being more of the expanding pockets than there are of the interconnected members.

2. The storage unit of claim 1, wherein the pockets each have a pair of opposed walls, a wall of each pocket being attached to a wall of an adjoining pocket.

3. The storage unit of claim 1, wherein the end members each comprise an end plate.

4. The storage unit of claim 3, wherein the extension mechanism is pivotally attached to each end plate.

5. The storage unit of claim 3, wherein the extension mechanism is slidably attached to each end plate.

6. The storage unit of claim 3, wherein one of the end plates is received permanently within a container.

7. The storage unit of claim 6, wherein the one of the end plates is slideably received within the container.

8. The storage unit of claim 6, wherein the other of said the end plates forms a cover for the container.

9. The storage unit of claim 1, wherein the extension mechanism comprises a first extension member and a second extension member.

10. The storage unit of claim 9, wherein the array of pockets resides in between the first and second extension members of the extension mechanism.

* * * * *